United States Patent
Gao et al.

(10) Patent No.: US 12,289,628 B2
(45) Date of Patent: Apr. 29, 2025

(54) METHOD FOR MEASURING AND REPORTING ASSOCIATED WITH GROUP INFORMATION

(71) Applicant: ZTE CORPORATION, Guangdong (CN)

(72) Inventors: Bo Gao, Shenzhen (CN); Zhaohua Lu, Shenzhen (CN); Yu Ngok Li, Shenzhen (CN); Ke Yao, Shenzhen (CN); Shujuan Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 383 days.

(21) Appl. No.: 17/855,650

(22) Filed: Jun. 30, 2022

(65) Prior Publication Data

US 2022/0345923 A1 Oct. 27, 2022

Related U.S. Application Data

(63) Continuation of application No. PCT/CN2020/104354, filed on Jul. 24, 2020.

(51) Int. Cl.
*H04W 24/08* (2009.01)
*H04L 5/00* (2006.01)
*H04W 24/10* (2009.01)

(52) U.S. Cl.
CPC ........... *H04W 24/08* (2013.01); *H04L 5/0048* (2013.01); *H04W 24/10* (2013.01)

(58) Field of Classification Search
CPC ...... H04L 5/0048; H04W 24/10; H04W 24/08

USPC .......................................... 370/329, 400, 405
See application file for complete search history.

(56) References Cited

U.S. PATENT DOCUMENTS

| 2019/0074883 | A1 | 3/2019 | Park et al. |
| 2019/0207722 | A1 | 7/2019 | Gao et al. |
| 2022/0239417 | A1* | 7/2022 | Cheng ................... H04L 1/1835 |

FOREIGN PATENT DOCUMENTS

| CN | 111416644 A | 7/2020 |
| WO | WO-2019/183878 A1 | 10/2019 |
| WO | WO-2019/221542 A1 | 11/2019 |
| WO | WO-2020/029200 A1 | 2/2020 |

OTHER PUBLICATIONS

Extended European Search Report for EP Appl. No. 20945946.0, dated Nov. 4, 2022 (12 pages).
Ericsson, "High Level Views on Rel-17 feMIMO" 3GPP TSG-RAN WG1 Meeting #101-e, Tdoc R1-2004633, Jun. 5, 2020, e-meeting (15 pages).

(Continued)

*Primary Examiner* — Dang T Ton
(74) *Attorney, Agent, or Firm* — Foley & Lardner LLP (57) ABSTRACT

A wireless communication method for use in a wireless terminal is disclosed. The wireless communication method comprises receiving, from a wireless network node, a first report configuration associated with one or more reference signals, measuring the one or more reference signals, and transmitting, to the wireless network node, a report comprising at least one of at least one first reference signal in the one or more reference signals, at least one channel quality or at least one first set of group information.

8 Claims, 4 Drawing Sheets

(56) References Cited

OTHER PUBLICATIONS

Huawei et al., "Remaining issues on CSI measurement" 3GPP TSG RAN WG1 Meeting #92, R1-1801451, Feb. 26, 2018, Athens, Greece (7 pages).
Huawei et al., "Remaining issues on R16 MIMO" 3GPP TSG RAN WG1 Meeting #100-e, R1-2001103, Mar. 6, 2020, e-meeting (5 pages).
International Search Report and Written Opinion for PCT Appl. No. PCT/CN2020/104354, mailed Apr. 22, 2021 (7 pages).
LG Electronics, "FL summary#1 on Rel-16 MB1 maintenance" 3GPP TSG RAN WG1 #101, R1-2003930, Jun. 5, 2020, e-Meeting (20 pages).
LG Electronics, "FL summary#2 on Rel-16 MB1 maintenance" 3GPP TSG RAN WG1 #101, R1-2003931, Jun. 5, 2020, e-Meeting (20 pages).
Nokia et al., "Discussion on Rel-17 NR FeMIMO" 3GPP TSG RAN WG1 Meeting #101-e, R1-2004269, Jun. 5, 2020, e-Meeting (9 pages).
Samsung, "New WID: Further enhancements on MIMO for NR" 3GPP TSG RAN Meeting #86, RP-193133, Dec. 12, 2019, Sitges, Spain (5 pages).
Samsung, "On Rel.17 FeMIMO WI" 3GPP TSG RAN WG1 #101, R1-2003918, Jun. 5, 2020, e-meeting (12 pages).
Samsung, "WID proposal for Rel.17 enhancements on MIMO for NR" 3GPP TSG RAN Meeting #86, RP-192436, Dec. 12, 2019, Sitges, Spain (5 pages).
ZTE, "Preliminary views on further enhancement for NR MIMO" 3GPP TSG RAN WG1 Meeting #101-e, R1-2003483, Jun. 5, 2020, e-Meeting (18 pages).

\* cited by examiner

METHOD FOR MEASURING AND REPORTING ASSOCIATED WITH GROUP INFORMATION

CROSS-REFERENCE TO RELATED APPLICATION

This application claims the benefit of priority under 35 U.S.C. § 120 as a continuation of PCT Patent Application No. PCT/CN2020/104354, filed on Jul. 24, 2020, the disclosure of which is incorporated herein by reference in its entirety.

TECHNICAL FIELD

This document is directed generally to wireless communications.

SUMMARY

When wide or ultra-wide spectrum resources are used, a considerable propagation loss induced by an extremely high frequency becomes a noticeable challenge. To solve this challenge, an antenna array and beam-forming training technologies using massive multiple-input-multiple-output (MIMO) (e.g. up to 1024 antenna elements for one node) have been adopted to achieve beam alignments and obtain a sufficiently high antenna gain. In order to keep implementation cost low while still benefiting from the antenna array, analog phase shifters become a highly attractive option for implementing mmWave (millimeter wave) beam-forming. That is, the number of controllable phases is finite and constant modulus constraints are placed on these antenna elements to reduce the cost of implementing the antenna array. Given pre-specified beam patterns, the variable-phase-shift-based beam forming training targets to identify the best pattern for subsequent data transmissions, generally, in a case of one-TRP (transmission (Tx) reception (Rx) point) and one-panel.

Generally, multi-TRPs and/or multi-panels may be considered for a base station (e.g. gNB) for beyond-5G and/or the next-generation communications. In addition, a user equipment (UE) may also have multiple panels in order to cover whole space and enhance a coverage. For example, a panel for the TRP or the UE side may have two transceiver units (TXRUs), which are associated with a cross polarization accordingly. Therefore, in order to achieve high rank or multi-layers transmission, the TRP and the UE may use different beams generated by different panels, which is also called simultaneous transmissions across multiple panels (STxMP), so as to achieve an objective of sufficiently using capability of each panel (e.g. associated TXRUs).

This document relates to methods, systems, and devices for measuring and/or reporting associated with (e.g. based on) group information.

The present disclosure relates to a wireless communication method for use in a wireless terminal. The wireless communication method comprises:

receiving, from a wireless network node, a first report configuration associated with one or more reference signals,
measuring the one or more reference signals, and
transmitting, to the wireless network node, a report comprising at least one of at least one first reference signal in the one or more reference signals, at least one channel quality or at least one first set of group information.

Various embodiments may preferably implement the following features:

Preferably, the wireless communication method further comprises associating second set of group information with at least one of a triggering state, a measurement configuration, a measurement window, the first report configuration of the report or at least one second reference signal in the one or more reference signal.

Preferably, the at least one second reference signal is measured based on the second set of group information.

Preferably, the at least one second reference signal is not associated with at least one of a quasi-co-location assumption or a transmission configuration indicator state.

Preferably, the second set of group information is not used for measuring the one or more reference signal or are applied to other downlink transmissions or uplink transmissions.

Preferably, a mapping between the second set of group information and the at least one second reference signal is maintained in a measurement window.

Preferably, a single set of group information comprises at least one of information grouping one or more reference signals, a reference signal resource set, a panel, a sub-array, an antenna group, an antenna port group, a beam, a beam group, a transmission unit or a reception unit.

Preferably, a mapping between the at least one first set of group information and the at least one first reference signal in a preceding group-based report is not maintained.

Preferably, a mapping between the at least one first set of group information and the at least one first reference signal in the report is maintained.

Preferably, the mapping is maintained X time units after transmitting the report or after receiving a confirmation message, where X is an integer.

Preferably, the measuring the one or more reference signals comprises: measuring at least one channel quality corresponding to the at least one first reference signal based on the at least one first set of group information.

Preferably, the report comprises a field indicating the first set of group information, wherein the field comprises a candidate value of Null.

Preferably, the report comprises a field indicating at least one of a type of the report or the number of the at least one first set of group information, and wherein the type of the report comprises at least one of a group based type, a beam group based type, an antenna group based type, or a non-group based type.

Preferably, at least one of the maximum number of the at least one first set of group information, a range of indexes corresponding to the at least one first set of group information, or a size of a field indicating the at least one first set of group information in the report is based on a capability signaling of the wireless terminal.

Preferably, the report further comprises a flag field indicating an availability of at least one of the at least one first reference signal or the at least one first set of group information for an uplink transmission.

Preferably, the first report configuration is associated with at least one of a second report configuration or a parameter of indicating the report for at least one of a downlink transmission, an uplink transmission or both a downlink and uplink transmission.

Preferably, wherein at least one of the reference signal corresponding to the first or the last A first sets of group information in the report, the first or the last B reference signals in the report, or the first or the last C reference signals in each first set of group information in the report is available for an uplink transmission, wherein A, B and C are positive integers.

Preferably, the report comprises at least one third set of group information, and wherein the reference signals corresponding to different third sets of group information are available for being simultaneously transmitted or for an uplink transmission.

Preferably, the report comprises at least one third set of group information, and wherein the reference signals corresponding to the same third set of group information or available for being simultaneously transmitted or for an uplink transmission.

Preferably, D reference signals out of the one or more reference signals are used for downlink transmissions or uplink transmissions performed at the same time, wherein D is a positive integer.

Preferably, the D reference signals correspond to different first sets of group information.

Preferably, the D reference signals correspond to the same first set of group information.

Preferably, there is a time gap between two uplink transmissions corresponding to different sets of group information or different reference signals.

Preferably, at most X reference signals of Y sets of group information and at most M reference signals of N sets of group information are transmitted simultaneously or are used for uplink transmissions performed at the same time, wherein X, Y, M and N are positive integers.

Preferably, the Y sets of group information are associated with at least one panel shared by a plurality of transmission chains and the N sets of group information are associated with at least one another panel shared by another plurality of transmission chains.

Preferably, an association between a single set of group information and one of the one or more reference signals is not applied in a measurement window.

Preferably, the one or more reference signals are confined within the measurement window.

Preferably, the wireless terminal receives only the one or more reference signals in the measurement window.

Preferably, the wireless terminal does not perform transmissions other than receiving the one or more reference signals in the measurement window.

Preferably, at least one of a measurement gap corresponding to the one or more reference signals, or a time gap between a channel of triggering the one or more reference signals and the first transmission of the one or more reference signals is greater than or equal to a threshold.

The present disclosure relates to a wireless communication method for use in a wireless network node. The wireless communication method comprises:

transmitting, to a wireless terminal, a first report configuration associated with one or more reference signals, transmitting, to the wireless terminal, the one or more reference signals, and receiving, from the wireless terminal, a report comprising at least one of at least one first reference signal in the one or more reference signals, at least one channel quality or at least one first set of group information.

Various embodiments may preferably implement the following features:

Preferably, second set of group information is associated with at least one of a triggering state, a measurement configuration, a measurement window, the first report configuration of the report or at least one second reference signal in the one or more reference signals.

Preferably, the at least one second reference signal is measured based on the second set of group information.

Preferably, the at least one second reference signal is not associated with at least one of a quasi-co-location assumption or a transmission configuration indicator state.

Preferably, the second set of group information are not used for measuring the one or more reference signal or are applied to other downlink transmissions or uplink transmissions.

Preferably, a mapping between the second set of group information and the at least one second reference signal is maintained in a measurement window.

Preferably, a single set of group information comprises at least one of information grouping one or more reference signals, a reference signal resource set, a panel, a sub-array, an antenna group, an antenna port group, a beam, a beam group, a transmission unit or a reception unit.

Preferably, a mapping between the at least one first set of group information and the at least one first reference signal in a preceding group-based report is not maintained.

Preferably, a mapping between the at least one first set of group information and the at least one first reference signal in the report is maintained.

Preferably, the mapping is maintained X time units after transmitting the report or after receiving a confirmation message, where X is an integer.

Preferably, at least one channel quality corresponding to the at least one first reference signal is measured based on the at least one first set of group information.

Preferably, the report comprises a field indicating the first set of group information, wherein the field comprises a candidate value of Null.

Preferably, the report comprises a field indicating at least one of a type of the report or the number of the at least one first set of group information, and wherein the type of the report comprises at least one of a group based type, a beam group based type, an antenna group based type, or a non-group based type.

Preferably, at least one of the maximum number of the at least one first set of group information, a range of indexes corresponding to the at least one first set of group information, or a size of a field indicating the at least one first set of group information in the report is based on a capability signaling of the wireless terminal.

Preferably, the report further comprises a flag field indicating an availability of at least one of the at least one first reference signal or the at least one first set of group information for an uplink transmission.

Preferably, the first report configuration is associated with at least one of a second report configuration or a parameter of indicating the report for at least one of a downlink transmission, an uplink transmission or both a downlink transmission and an uplink transmission.

Preferably, at least one of the reference signal corresponding to the first or the last A first sets of group information in the report, the first or the last B reference signals in the report, or the first or the last C reference signals in each first set of group information in the report is available for an uplink transmission, wherein A, B and C are positive integers.

Preferably, the report comprises at least one third set of group information, and wherein the reference signals corresponding to different third sets of group information are available for being simultaneously transmitted or for an uplink transmission.

Preferably, the report comprises at least one third set of group information, and wherein the reference signals corresponding to the same third set of group information or available for being simultaneously transmitted or for an uplink transmission.

Preferably, D reference signals out of the one or more reference signals are used for downlink transmissions or uplink transmissions performed at the same time, wherein D is a positive integer.

Preferably, the D reference signals correspond to different first sets of group information.

Preferably, the D reference signals correspond to the same first set of group information.

Preferably, there is a time gap between two uplink transmissions corresponding to different sets of group information or different reference signals.

Preferably, at most X reference signals of Y sets of group information and at most M reference signals of N sets of group information are transmitted simultaneously or are used for uplink transmissions performed at the same time, wherein X, Y, M and N are positive integers.

Preferably, the Y sets of group information are associated with at least one panel shared by a plurality of transmission chains and the N sets of group information are associated with at least one another panel shared by another plurality of transmission chains.

Preferably, an association between a single set of group information and one of the one or more reference signals is not applied in a measurement window.

Preferably, the one or more reference signals are confined within the measurement window.

Preferably, the wireless network node transmits only the one or more reference signals in the measurement window to the wireless terminal.

Preferably, the wireless network node does not perform transmissions with the wireless terminal other than transmitting the one or more reference signals in the measurement window.

Preferably, at least one of a measurement gap corresponding to the one or more reference signals, or a time gap between a channel of triggering the one or more reference signals and the first transmission of the one or more reference signals is greater than or equal to a threshold.

The present disclosure relates to a wireless terminal. The wireless terminal comprises:

a communication unit, configured to receive, from a wireless network node, a first report configuration associated with one or more reference signals, and a processor configured to measure the one or more reference signals, wherein the communication unit is further configured to transmit, to the wireless network node, a report comprising at least one of at least one first reference signal in the one or more reference signals, at least one channel quality or at least one first set of group information.

Various embodiments may preferably implement the following feature:

Preferably, the processor is configured to perform a wireless communication method of any of the foregoing described methods.

The present disclosure relates to a wireless network node. The wireless network node comprises a communication unit, configured to:

transmit, to a wireless terminal, a first report configuration associated with one or more reference signals, and transmit, to the wireless terminal, the one or more reference signals, and receive, from the wireless terminal, a report comprising at least one of at least one first reference signal in the one or more reference signals, at least one channel quality or at least one first set of group information.

Various embodiments may preferably implement the following feature:

Preferably, the wireless network node further comprises a processor configured to perform a wireless communication method of any of the foregoing described methods.

The present disclosure relates to a computer program product comprising a computer-readable program medium code stored thereupon, the code, when executed by a processor, causing the processor to implement a wireless communication method recited in any of foregoing methods.

The exemplary embodiments disclosed herein are directed to providing features that will become readily apparent by reference to the following description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

The above and other aspects and their implementations are described in greater detail in the drawings, the descriptions, and the claims.

DETAILED DESCRIPTION

Figure 1:
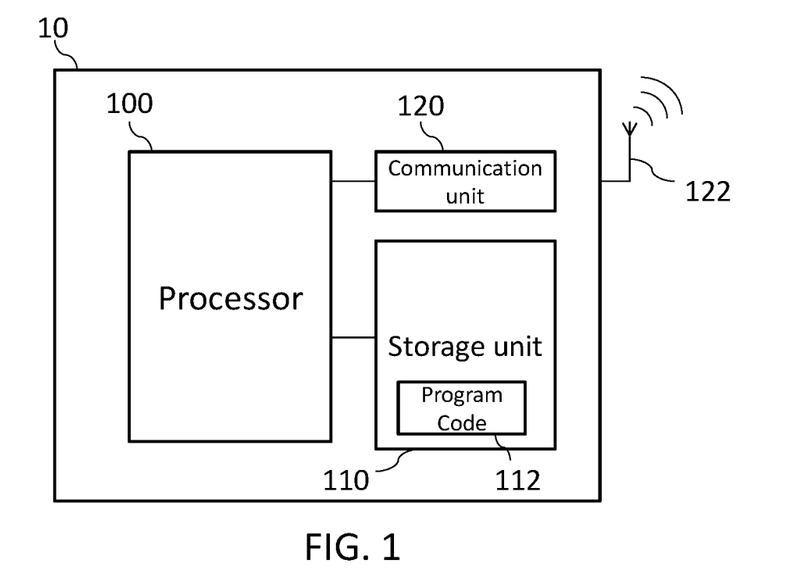
FIG. 1 shows an example of a schematic diagram of a wireless terminal according to an embodiment of the present disclosure.

FIG. 1 relates to a schematic diagram of a wireless terminal 10 according to an embodiment of the present disclosure. The wireless terminal 10 may be a user equipment (UE), a mobile phone, a laptop, a tablet computer, an electronic book or a portable computer system and is not limited herein. The wireless terminal 10 may include a processor 100 such as a microprocessor or Application Specific Integrated Circuit (ASIC), a storage unit 110 and a communication unit 120. The storage unit 110 may be any data storage device that stores a program code 112, which is accessed and executed by the processor 100. Embodiments of the storage unit 112 include but are not limited to a subscriber identity module (SIM), read-only memory (ROM), flash memory, random-access memory (RAM), hard-disk, and optical data storage device. The communication unit 120 may a transceiver and is used to transmit and receive signals (e.g. messages or packets) according to processing results of the processor 100. In an embodiment, the communication unit 120 transmits and receives the signals via at least one antenna 122 shown in FIG. 1.

In an embodiment, the storage unit 110 and the program code 212 may be omitted and the processor 100 may include a storage unit with stored program code.

The processor 100 may implement any one of the steps in exemplified embodiments on the wireless terminal 10, e.g., by executing the program code 112.

The communication unit 120 may be a transceiver. The communication unit 120 may as an alternative or in addition be combining a transmitting unit and a receiving unit configured to transmit and to receive, respectively, signals to and from a wireless network node (e.g. a base station).

Figure 2:
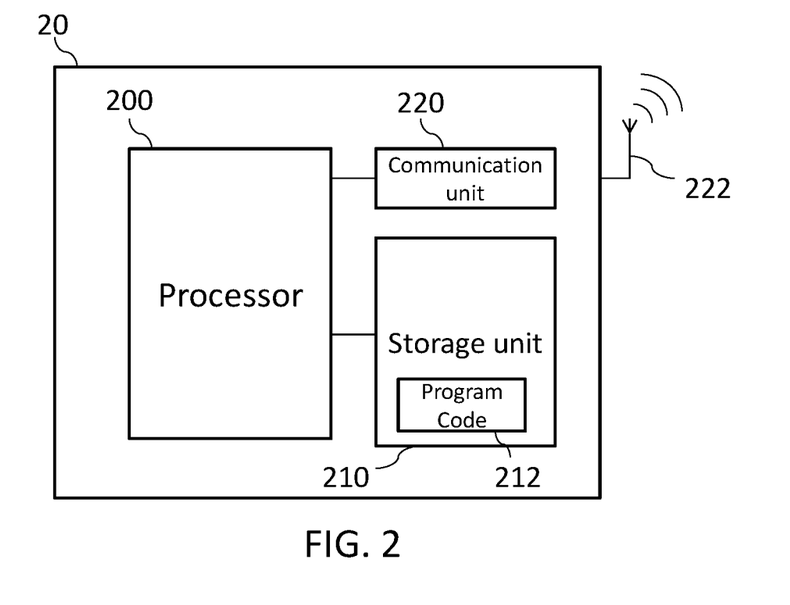
FIG. 2 shows an example of a schematic diagram of a wireless network node according to an embodiment of the present disclosure.

FIG. 2 relates to a schematic diagram of a wireless network node 20 according to an embodiment of the present disclosure. The wireless network node 20 may be a satellite, a base station (B S), a network entity, a Mobility Management Entity (MME), Serving Gateway (S-GW), Packet Data Network (PDN) Gateway (P-GW), a radio access network (RAN), a next generation RAN (NG-RAN), a data network, a core network or a Radio Network Controller (RNC), and is not limited herein. In addition, the wireless network node 20 may comprise (perform) at least one network function such as an access and mobility management function (AMF), a session management function (SMF), a user place function (UPF), a policy control function (PCF), an application function (AF), etc. The wireless network node 20 may include a processor 200 such as a microprocessor or ASIC, a storage unit 210 and a communication unit 220. The storage unit 210 may be any data storage device that stores a program code 212, which is accessed and executed by the processor 200. Examples of the storage unit 212 include but are not limited to a SIM, ROM, flash memory, RAM, hard-disk, and optical data storage device. The communication unit 220 may be a transceiver and is used to transmit and receive signals (e.g. messages or packets) according to processing results of the processor 200. In an example, the communication unit 220 transmits and receives the signals via at least one antenna 222 shown in FIG. 2.

In an embodiment, the storage unit 210 and the program code 212 may be omitted. The processor 200 may include a storage unit with stored program code.

The processor 200 may implement any steps described in exemplified embodiments on the wireless network node 20, e.g., via executing the program code 212.

The communication unit 220 may be a transceiver. The communication unit 220 may as an alternative or in addition be combining a transmitting unit and a receiving unit configured to transmit and to receive, respectively, signals to and from a wireless terminal (e.g. a user equipment).

In the present disclosure, the definition of "beam" may be equivalent to a quasi-co-location (QCL) state, a transmission configuration indicator (TCI) state, a spatial relation state (also called as spatial relation information state), a reference signal (RS), a spatial filter or a pre-coding.

More specifically, in the present disclosure:
1) The definition of "Tx beam" may be equivalent to the QCL state, TCI state, the spatial relation state, a downlink/uplink (DL/UL) reference signal, a Tx spatial filter or a Tx precoding;
2) The definition of "Rx beam" may be equivalent to the QCL state, the TCI state, the spatial relation state, the spatial filter, a Rx spatial filter or a Rx precoding;
3) The definition of "beam ID" may be equivalent to QCL state index, TCI state index, spatial relation state index, reference signal index, spatial filter index or precoding index.

In the present disclosure, the reference signal comprises a channel state information reference signal (CSI-RS), a synchronization signal block (SSB) (which is also called as SS/PBCH), a demodulation reference signal (DMRS), a sounding reference signal (SRS), or a physical random access channel (PRACH).

In the present disclosure, the spatial filter may be a spatial filter of either the UE-side or the gNB-side. In addition, the spatial filter may be called as spatial-domain filter.

In the present disclosure, "spatial relation information" is comprised of one or more reference RSs, which is used to represent "spatial relation" between targeted "RS or channel" and the one or more reference RSs, where "spatial relation" means the same/quasi-co beam(s), same/quasi-co spatial parameter(s), or same/quasi-co spatial domain filter(s).

In the present disclosure, "spatial relation" may mean the beam, the spatial parameter, or the spatial domain filter.

In the present disclosure, "QCL state" is comprised of one or more reference RSs and their corresponding QCL type parameters, where QCL type parameters include at least one of the following aspect or combination: [1] Doppler spread, [2] Doppler shift, [3] delay spread, [4] average delay, [5] average gain, and [6] Spatial parameter (which is also called as spatial Rx parameter). In this patent, "TCI state" is equivalent to "QCL state". In this patent, there are the following definitions for 'QCL-TypeA', 'QCL-TypeB', 'QCL-TypeC', and 'QCL-TypeD'.
  'QCL-TypeA': {Doppler shift, Doppler spread, average delay, delay spread}
  'QCL-TypeB': {Doppler shift, Doppler spread}
  'QCL-TypeC': {Doppler shift, average delay}
  'QCL-TypeD': {Spatial Rx parameter}

In the present disclosure, "UL signal" may be a PRACH, a physical UL control channel (PUCCH), a physical UL shared channel (PUSCH), or an SRS.

In the present disclosure, "DL signal" may be a physical DL control channel (PDCCH), a physical DL shared channel (PDSCH), a SSB, or a CSI-RS.

In the present disclosure, the group-based reporting comprises at least one of "beam group" based reporting and "antenna group" based reporting.

In the present disclosure, the definition of "beam group" is that different Tx beams within one group can be simultaneously received or transmitted, and/or Tx beams between different groups may NOT be simultaneously received or transmitted. In addition, the definition of "beam group" is described from UE perspective.

In the present disclosure, the definition of "antenna group" may be that different Tx beams within one group may NOT be simultaneously received or transmitted, and/or Tx beams between different groups can be simultaneously received or transmitted.

In the present disclosure, the definition of "antenna group" is that more than N different Tx beams within one group can NOT be simultaneously received or transmitted, and/or no more than N different Tx beams within one group can be simultaneously received or transmitted, wherein N is a positive integer.

In the present disclosure, the definition of "antenna group" may be that Tx beams between different groups can be simultaneously received or transmitted.

In the present disclosure, the definition of "antenna group" may be described from the UE perspective.

In the present disclosure, the antenna group may be equivalent to antenna port group, panel or UE panel. Furthermore, antenna group switching is equivalent to panel switching.

In the present disclosure, the "group information" may be equivalent to "information grouping one or more reference signals", "resource set", "panel", "sub-array", "antenna group", "antenna port group", "group of antenna ports", "beam group", "transmission entity/unit", or "reception entity/unit". Furthermore, the "group information" is to represent the UE panel and some features related to the UE panel. In addition, the "group information" may be equivalent to "group state" or "group ID".

In the present disclosure, the "group information" may be equivalent to "a set of group information".

In the present disclosure, "time unit" may be a sub-symbol, a symbol, a slot, a subframe, a frame, or a transmission occasion.

In the present disclosure, the active antenna group may be equivalent to only an active DL antenna group, only an active UL antenna group, or active DL and UL antenna groups.

In the present disclosure, "at least one" is equal to "one or more", and vice versa.

In 5G new radio (NR), analog beam-forming is firstly introduced into mobile communications for guaranteeing a robustness of high frequency communications. For the DL transmissions, a QCL state (the QCL state may be called as TCI state) is introduced for supporting a beam indication for a DL control channel (i.e. PDCCH), DL data channel (i.e. PDSCH), and CSI-RS. Similarly, for the UL transmissions, spatial relation information (e.g. spatialRelationInfo) is introduced for supporting a beam indication for a UL control channel (i.e., PUCCH) and the SRS. Besides, the beam indication for a UL data channel (i.e. PUSCH) is achieved through mapping with one or more SRS resources, which are indicated by the gNB, and ports of the UL data channel. That is, the beam configuration for the UL data channel can be derived from the spatial relation information associated with the SRS resources or ports accordingly.

However, current 5G NR communications are based on an assumption that there is only a single panel in the UE side. In other words, only one DL Tx beam can be received or only one UL Tx beam can be transmitted at a given time instant by the UE. If the UE has multiple panels, activations or deactivations of the multiple panels are totally up to an implementation of the UE.

In addition, for the UE with multiple panels, the number of active DL panels and the number of active UL panels may be different at a given time instant. It is due to the fact that a throughput requirement for the DL transmissions is much more than that for the UL transmissions, and meanwhile the UL transmissions with a power amplifier (PA) require a higher power consumption. In practice, the number of UL panels/RF-Tx (radio frequency Tx) chains in the UE may be smaller than the number of DL panels/RF-Rx (radio frequency Rx) chains, and there may be an SRS antenna switching across the multiple panels.

Nevertheless, this architecture of the beam management may have significant limitations on the transmission performance and the UE-side power saving when the UE has the multiple panels. For the transmission performance (regardless of the DL or UL transmissions), simultaneous multi-beam transmissions on the multiple panels can support a higher RANK transmission and get a greater spatial diversity gain. Therefore, the channel capacity can be improved significantly. On the other hands, for the UE-side power saving, due to lack of UE-side preference about panel states (e.g. idle state or active state) and measurement results for each panel, certain low-performance panels may always be active if the UL beam of the panel is configured for a dynamic indication by the gNB. Therefore, a group-based measurement and/or reporting for the DL and UL transmissions (e.g., simultaneous receptions by the multiple panels of the UE and UE UL panel switching & simultaneous transmission) is disclosed in the present disclosure. To be more specific, the present disclosure discloses methods related to a group-based measurement/reporting which target at least the following issues.

1) For single UE, the group-based measurement/reporting is used to probe panel-specific channel properties with a high implementation and computation complexity, but, on the other hand, the non-group-based measurement/reporting can quickly inform channel qualities without considering the UE panel re-selection. Consequently, the relationship between (preceding) non-group based and (preceding) group-based measurement/reporting needs to be considered.

2) In order to improve the flexibility of the UE panel and beam selection, a window duration for an RSRP/SINR (reference signal received power/signal to interference and noise ratio) measurement (e.g. a type of beam measurement) and applicable timings/conditions for the group-based measurement/reporting need to be fully considered. More specifically, the measurement resources for the RSRP/SINR may be confined within the window duration and there may be scheduling restrictions for the window duration where the gNB cannot schedule any other DL and/or UL transmissions. In such a case, the UE can automatically re-activate or re-deactivate the DL/UL panels based on throughput requirements, the UE blockage, the maximum power exposure (MPE) and/or an overheat issue.

3) The group-based measurement/reporting may be considered to inform information about both the DL simultaneous reception and the panel-specific UL transmissions (e.g., effective UL beam/panel for subsequent transmissions) because of the imbalance between the DL receptions and the UL transmissions on the UE side as well as the UE antenna switching.

4) A heterogeneous structure of UE Tx and Rx panels may need to be fully considered, due to the fact that there is a variety of UE panel structures. For example, the UE (e.g. a mobile phone) may have panels on the left side, right side and top side of its housing or panels on the left side, right side, front side and rear side of the housing. In addition, the panels on certain sides (e.g. the top side) of the housing may have a very low probability for the UE blockage while the panels on other sides (e.g., the front side or the rear side) may have a high probability for the UE blockage. In an embodiment, the panels on the front side and the rear side may not be valid for the simultaneous transmissions because of the unpredicted UE blockage. That is, certain specific panel/antenna layouts involving the antenna switching may be considered.

Embodiment #1: General Description for the Group-Based and Non-Group-Based Reporting When the UE supports both the group-based and non-group-based reporting, the UE may be triggered or initialized for the group-based and non-group-based reporting separately. Specifically, the group-based reporting may provide panel-specific/simultaneous reception information (e.g., group information) along with beam information (e.g., the beam ID, the CRI, and the SSBRI). In comparison, the non-group-based reporting may only provide the beam information (e.g., the beam ID) and there is not further information about the panel-specific/simultaneous reception information (e.g., the group information). In such a case, when the UE performs the mode of multi-panels operation, the non-group-based reporting may be performed according to a portion or all of the UE panels. The relationship between the group-based and non-group-based reporting and the UE assumption for the non-group-based reporting under the multi-panels operation may need to be considered.

In an embodiment, the relationship between the group-based and non-group-based reporting may be determined based on an explicit group ID which is reported in the group-based reporting related information in addition to the beam information (e.g., CSI-RS resource Indicator (CRI) and/or SSB resource indicator (SSBRI)). As an alternative or in addition, the TCI state configured to a CSI-RS resource may contain a group/panel ID (e.g., a global ID) in addition to an RS ID.

In an embodiment, there is a mapping between the gNB Tx beam (e.g. beam information) and the UE antenna group (e.g. a UE DL Rx panel).

As an alternative or in addition, if the explicit group ID is not configured in the TCI state or reported in the group-based reporting related information, at least one of the following cases may be considered.

CASE-1: Group-Based Reporting after Non-Group-Based Reporting

In this case, the preceding non-group-based reporting may identify (e.g. indicate or determine) a candidate beam pool that may involve multiple UE panels and the group-based reporting may identify that which beam pairs can be received simultaneously or not.

In an embodiment, for the group-based measurement, each of the measured N CSI-RS resource(s) is configured with an independent TCI state, wherein N is a positive integer.

CASE-2: Non-Group-Based Reporting after Group-Based Reporting

In such a case, the preceding group-based reporting may measure whole channel properties for each of the panels and the non-group-based reporting may perform a beam refinement under a given DL beam and/or a given UE panel.

In an embodiment, the group information is configured for at least one of a triggering state, a measurement configuration, a measurement window or a report configuration.

In an embodiment, the group information may be associated with the non-group based reporting or measurement.

In an embodiment, the UE may perform the RSRP/SINR measurement according to the group information.

In an embodiment, the UE may maintain the mapping between the group information and the beam within single measurement window.

In an embodiment, there are N CSI-RS resources with repetition=off and different TCI states and there is a window for measurement restriction, where the UE cannot modify the associated panel with the TCI state, wherein N is a positive integer.

CASE-3: Group-Based Reporting after Group-Based Reporting

In such a case, the preceding group-based reporting may measure the whole channel properties for each of the panels and the subsequent group-based reporting (e.g., L1-SINR) may provide a beam pair which has greater performance for subsequent transmissions.

For the subsequent group-based reporting, the following two mode for the group-based reporting may be indicated by the gNB:

Mode-1: The UE may not need to maintain the mapping between the group information and the beams, wherein this mapping is assumed in the preceding group-based reporting or the configuration.

Mode-2: The UE maintains the mapping between the group information and the beams, in order to do the beam refinement regarding to the beams and panels.

In an embodiment, the mapping between the group information and the beams are maintained for X time units, wherein X is an integer. For example, the mapping between the group information and the beams are maintained for X time units after transmitting the group-based report or after receiving a confirmation message in response to the group-based report. Furthermore, the confirmation message is transmitted by the gNB. For instance, the confirmation message comprises a DCI command or a MAC-CE command.

In an embodiment, in order to inherit the mapping between the group information and beam, there is an association between a reporting/measurement (e.g., the subsequent group/non-group based reporting) and another reporting/measurement (e.g., the preceding group/non-group based).

In an embodiment, in order to automatically deactivate a portion of its panels, when the gNB indicates the group-based reporting, the UE may switch to the non-group based reporting with only one active panel and the non-group based reporting is reported to the gNB by the UE. In this embodiment, at least one of the following options is supported:

Option-1: The field of a report instant may include a candidate value of "NULL" for the group information or single beam. For example, the UE can indicate the value of "NULL" for a group information or a beam in the reporting instant, to indicate that there is no effective beam to be used in the group. For sake of presentation, one example can be found in Table I, including a report field of the group information that includes the (candidate) value of "NULL" to indicate the non-group-based reporting.

TABLE I

An example of report format for group-based reporting

| Group information (Value includes {NULL, 0, 1, . . .}) | Beam ID | Beam quality (e.g. RSRP/SINR) |
| --- | --- | --- |
| Group information-x | RS ID-x1 | Beam quality-x1 |
|  | RS ID-x2 | Beam quality-x2 |

TABLE I-continued

An example of report format for group-based reporting

| Group information (Value includes {NULL, 0, 1, . . .}) | Beam ID | Beam quality (e.g. RSRP/SINR) |
|---|---|---|
| Group information-y | RS ID-y1 | Beam quality-y1 |
| | RS ID-y2 | Beam quality-y2 |

Option-2: The report instant may include a field of indicating a mode or the number of groups, wherein the indicated mode includes the group based or the non-group based reporting. In an embodiment, the indicated mode and the number of groups may be jointly coded. For instance, when the field is reported with a value of 0, the non-group based reporting is performed accordingly; otherwise, the value of the field is used to indicate the number of groups.

In an embodiment, the UE may indicate a mode or the number of groups in the reporting instance. For sake of presentation, one example can be found in the following Table II, where there is header information to jointly indicate the group/non-group mode and the number of groups.

TABLE II

Another example for the report format for group-based reporting

| Header information (Values corresponds to {non-group based, the number of groups to be reported}) | Group information (e.g., 0, 1, . . .}) | Beam ID | Beam quality (e.g. RSRP/SINR) |
|---|---|---|---|
| Header information | Group information-x | RS ID-x1 | Beam quality-x1 |
| | | RS ID-x2 | Beam quality-x2 |
| | Group information-y | RS ID-y1 | Beam quality-y1 |
| | | RS ID-y2 | Beam quality-y2 |

In an embodiment, the group information (e.g., information grouping one or more reference signals) may be implicitly carried by the report as a predefined rule, rather than that there is an explicit field corresponding to the group information. The continuous X RS ID(s) in the report can be assumed as a group, where X is a positive integer (e.g., configured by the gNB). For instance, the report may have only the fields of "Beam ID" and "Beam quality" shown in Table II are carried in the report and X=2. In such case, the "RS ID-x1" and "RS ID-x2" are assumed to be grouped with the group information-x (e.g., group information-0) by default and the "RS ID-y1" and "RS ID-y2" are assumed to be grouped with the group information-y (e.g., group information-1) by default.

In an embodiment, the number of groups to be reported in the report instant is determined based on the UE capability and the total number of the groups/range of group IDs supported by the UE is also determined based on the UE capability.

In an embodiment, the beam ID is used for the sake of presentation herein. In an embodiment, the beam ID may be represented by the RS ID (as shown in Table I and Table II) in the report instance.

In an embodiment, the gNB may indicate one report configuration which is related to both the group-based reporting and the non-group-based reporting. In this embodiment, the UE may determine the final reporting which is relevant to the group-based reporting or the non-group-based reporting.

Embodiment #2: Measurement Window for Supporting UE-Initialized Panel Switching and Corresponding Measurement Requirement In order to initialize the UE panel switching, when multiple DL RSs are configured for the beam measurement, the UE may perform at least of the following for the measurement/reporting:

association between the group information and the beams may be applied or not applied, and/or association between the TCI state and the UE spatial filter may be applied or not applied, and/or the QCL assumption (e.g., QCL Type-D) may be applied or not applied.

In an embodiment, "not applied" is equivalent to "not maintained" or "ignored".

In the measurement windows (e.g., SS/PBCH block measurement time configuration (SMTC) window durations), the UE can freely measure the DL RS(s) for the RSRP/SINR measurement(s) without restrictions of the association between the group information and the beams (e.g. the mapping between the TCI states/DL RSs and any one of UE panels). Note that the gNB does not schedule any other DL or UL transmissions within the measurement windows.

In an embodiment, the UE maintains the mapping between the group information and the beams (e.g. the TCI state of DL RS for the RSRP/SINR measurement) outside the measurement windows.

In an embodiment, the DL RS(s) for the measurement corresponding to the group-based reporting is confined within the measurement window. In other words, there is no antenna-group restriction for the measurement(s) corresponding to the group-based reporting.

In an embodiment, a scheduling restriction is applied to the measurements for the group-based reporting (e.g., for the RSRP/SINR). To be more specific, the UE may not be expected to transmit the UL signal(s) (e.g., the PUCCH/PUSCH/SRS) or to receive other DL signal(s) (e.g., the PDCCH/PDSCH/CSI-RS for tracking/CSI-RS for the CQI) on the time units (e.g., symbols) of receiving the DL RS(s) of the group based reporting.

In an embodiment, the measurement window may be associated with the group-based reporting. For example, when the RS is the CSI-RS, the CSI-RS is periodic or semi-persistent. As an alternative or in addition, the RS for the group-based reporting are confined within the measurement window.

In an embodiment, when the RS is the aperiodic CSI-RS, the offset set between the PDCCH triggering the aperiodic CSI-RS and the aperiodic CSI-RS, or the measurement gap of the aperiodic CSI-RS may be greater than or equal to a threshold, wherein the threshold may be a specific value or determined based on the UE (reporting) capability.

In an embodiment, the measurement window is applied for the RS.

In an embodiment, the RS is QCLed with the active TCI state for the PDCCH/PDSCH. That is, the RS and the active TCI state for the PDCCH/PDSCH have the same QCL assumption.

In an embodiment, the RS is configured with the RRC parameter repetition.

In an embodiment, the RS may be the SSB or the CSI-RS.

In an embodiment, in a normal RSRP/SINR measurement, when the RS for the L1-RSRP measurement is the CSI-RS which is QCLed with the active TCI state for the PDCCH/PDSCH and not in the CSI-RS resource set with repetition ON, there are no scheduling restrictions because the L1-RSRP measurement is performed based on the CSI-RS. In comparison, for the group-based reporting, even when the CSI-RS is QCLed with the active TCI state for the PDCCH/PDSCH and not in the CSI-RS resource set with repetition ON, there are still scheduling restrictions for initializing the UE group/panel specific measurement (e.g., activating or deactivating UE panels automatically).

In an embodiment, as mentioned in the Embodiment #1, for the non-group-based reporting, the measurement window or the scheduling restriction may be applied for the corresponding measurements (e.g., for the RSRP/SINR).

Figure 3A:
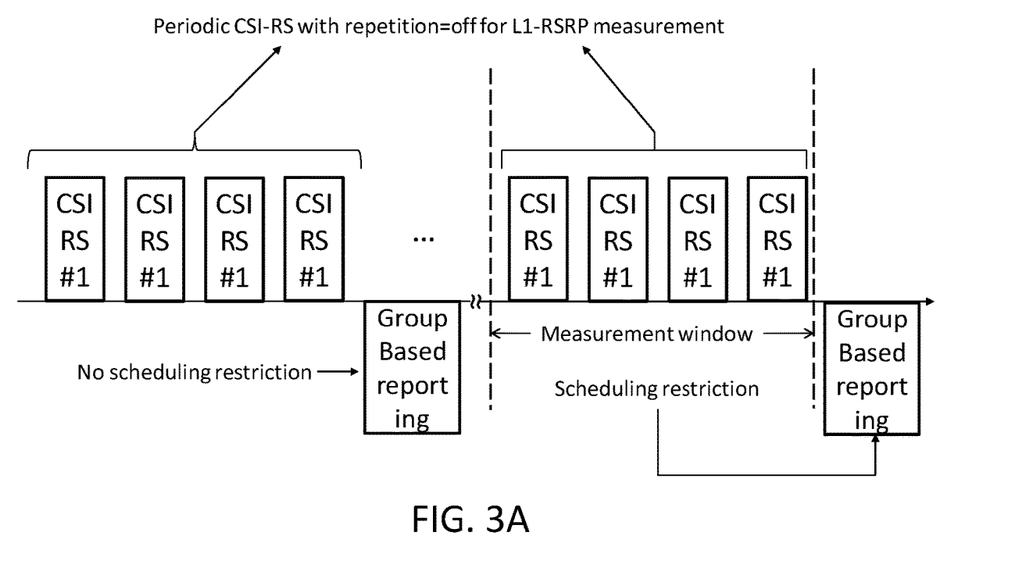
FIG. 3A shows a schematic diagram of periodic channel state information reference signals according to an embodiment of the present disclosure.
Figure 3B:
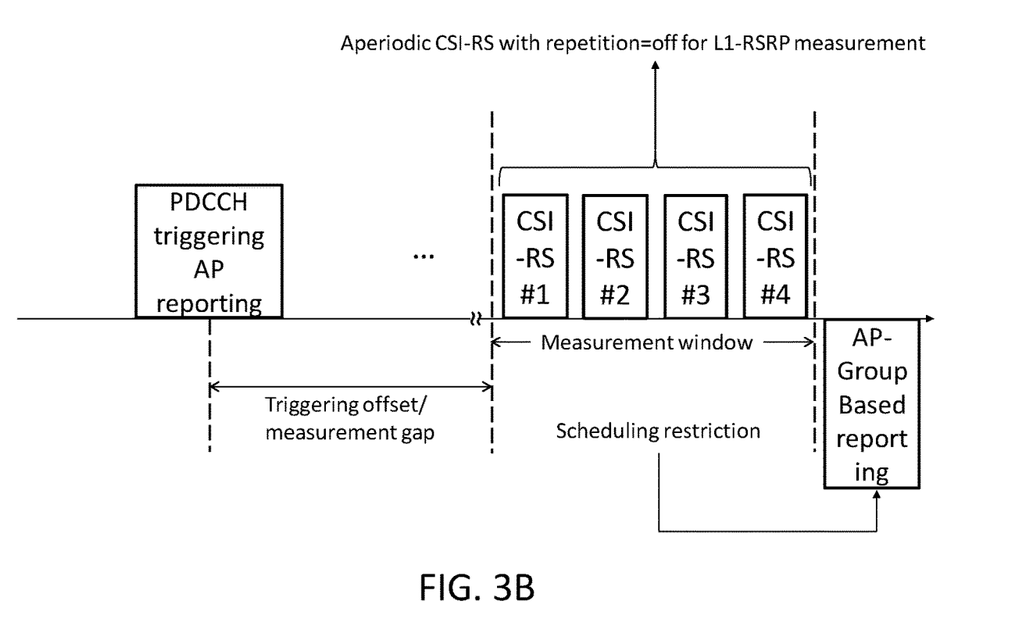
FIG. 3B shows a schematic diagram of aperiodic channel state information reference signals according to an embodiment of the present disclosure.

FIGS. 3A and 3B respectively show examples of the periodic CSI-RS and the aperiodic CSI-RS with considering measurement restrictions.

FIG. 3A shows a schematic diagram of the periodic CSI-RSs with repetition=off for the L1-RSRP measurement according to an embodiment of the present disclosure. In FIG. 3A, there is another measurement window (periodic) being configured. Thus, the scheduling restriction(s) is applied to the CSI-RSs within the measurement window (but not to the CSI-RSs outside the measurement window).

As a result, for the CSI-RSs outside the measurement window, the UE uses its Rx beam and panel corresponding to the TCI state of the CSI-RSs to measure the CSI-RS, and the corresponding measurement results are accordingly reported. On the other hands, for the CSI-RS within the measurement window, the UE can randomly use its Rx beam or panel to probe the CSI-RSs with the objective of maximizing the RSRP/SINR. Based on the best combination of the CSI-RSs, the UE Rx beam and the UE panel, the corresponding measurement results are accordingly reported.

In an embodiment, the CSI-RS may be configured with only one of the QCL-TypeA, the QCL-TypeB or the QCL-TypeC. That is, the CSI-RS is not configured with the QCL-TypeD.

FIG. 3B shows a schematic diagram of the aperiodic CSI-RSs with repetition=off for the L1-RSRP measurement according to an embodiment of the present disclosure. In FIG. 3B. when the triggering offset is greater than or equal to the threshold, the scheduling restriction for the AP-CSI-RS is applied. Consequently, the UE can ignore the QCL-TypeD or antenna-group related assumptions for the L1-RSRP measurement, and reports the beam and group information with the objective of the RSRP corresponding to any pair of the group of the CSI-RSs, the UE Rx beams and the UE Rx panels.

Embodiment #3: Beam Measurement Dedicated to Partial UE Panels

In an embodiment, when the CSI (e.g. the SINR or the RSRP) measurement is based on the SSB and/or the CSI-RS, the group information can be provided for the CSI measurement/report configuration. In this embodiment, the antenna group related to the group information is assumed as the measurement resources for the CSI measurement/report configuration.

In an embodiment, the CSI-RS is not associated with the QCL assumption or the TCI state.

In an embodiment, when the CSI measurement is based on the CSI-RS that is associated with the QCL assumption or the TCI state, the group information (e.g., UE panel ID(s)) may be provided for the measurement. In this embodiment, the antenna group related to the group information is assumed as the measurement resources for the CSI measurement/report configuration.

In an embodiment, the group information or the beam may be provided for the CSI measurement and the antenna group corresponding to the group information or the beam may be precluded for the CSI measurement. In other words, the UE assumes that, for the CSI measurement/reporting, the group information or beam(s) is reserved for other transmissions, e.g., for other TRP(s).

In an embodiment, the CSI measurement/reporting may be the group-based reporting or non-group-based reporting.

Figure 4:
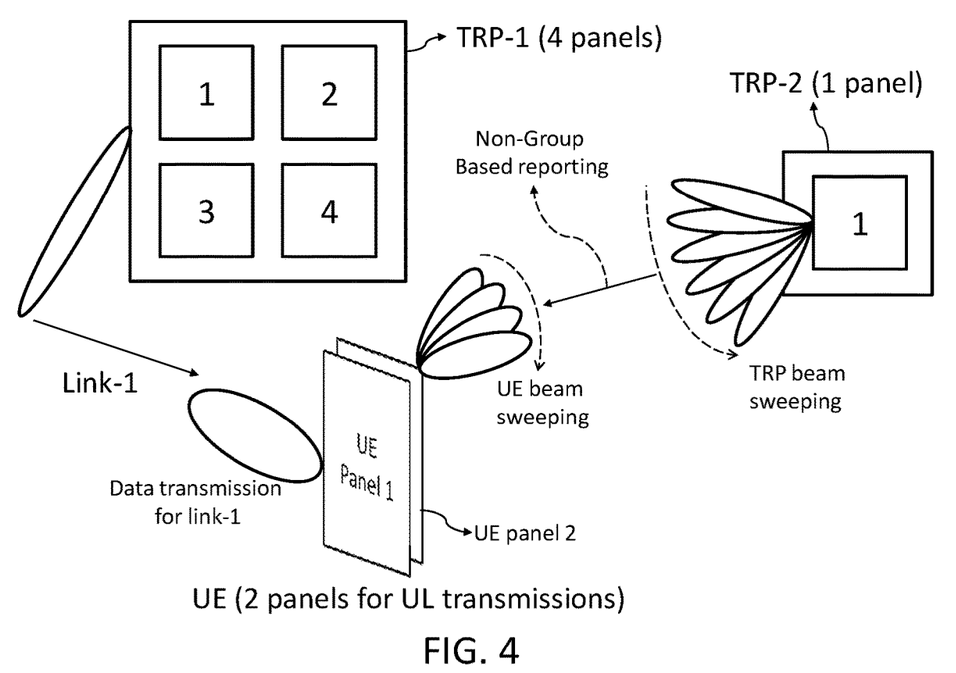
FIG. 4 shows a schematic diagram of two transmission reception points and one user equipment according to an embodiment of the present disclosure.

FIG. 4 shows a schematic diagram of two TRPs TRP-1 and TRP-2 and one UE according to an embodiment of the present disclosure. In FIG. 4, the UE has 2 panels (i.e. a UE panel-1 and a UE panel-2) for the UL transmissions, the TRP-1 has 4 panels and the TRP-2 has 1 panel. In addition, a Link-1 and a Link-2 are relevant to the TRP-1 and the TRP-2, respectively. When the non-group-based reporting/measurement is performed for the link-2, the UE may be indicated with the group information related to the UE panel-1, which is precluded for the measurement.

Embodiment #4: Joint Group-Based Reporting with DL and UL Beam Information

In an embodiment of the UE with X antenna groups implemented in the UE (as a total number of antenna groups in the UE side), the UE may support up to Y active antenna groups for the DL receptions and up to Z active antenna groups for the UL transmissions, wherein X, Y and Z are positive integers and the Z antenna groups are selected from the Y antenna groups.

In this embodiment, for a reporting, there may be a flag field configured to indicate the corresponding group information(s) or the corresponding beam(s) that can be used for the UL transmissions. Furthermore, the UE can be configured through the report configuration command (from the gNB) to report a reporting instance that corresponds to DL only, UL only or both DL and UL. In such a case, the gNB can flexibly report one type of reporting instance, e.g., only for a UL transmission.

More specifically, the flag field may involve candidate values of {Used, Not Used} for the UL transmissions. The following Table III shows an example of this embodiment. In table III, for each group, the UE may further provide one flag (e.g. Flag-x or Flag-y) for indicating whether the corresponding beam information can be used for the UL transmissions.

TABLE III

Example for joint group based reporting with DL and UL beam information

| Group information | Flag for indicating UL (candidate value of {Used, Not-Used}) | Beam ID | Beam quality (e.g. RSRP/SINR) |
|---|---|---|---|
| Group information-x | Flag-x | RS ID-$x_1$ | Beam quality-$x_1$ |
|  |  | RS ID-$x_2$ | Beam quality-$x_2$ |
| Group information-y | Flag-y | RS ID-$y_1$ | Beam quality-$y_1$ |
|  |  | RS ID-$y_2$ | Beam quality-$y_2$ |

In an embodiment, for a reporting, the beams available for the UL transmission may be determined according to at least one of the following rules:

1) The beam within the first/last N groups in a reporting instant, where N is a positive integer.
2) The first/last M beam(s) in a reporting instant (e.g., for non-group-based reporting), where M is a positive integer.
3) The set of first/last K beam(s) in each of group in a reporting instant, where K is a positive integer.

In an embodiment, for a reporting, there is UL group information (e.g., UL panel ID) indicating which beams can be used for the UL transmission(s) simultaneously or for a UL transmission. In addition, the beams with different UL group information can be transmitted simultaneously or used for a UL transmission.

In an embodiment, the candidate values for the UL group information include a value of "NULL" which means that the corresponding group(s) or corresponding beam(s) cannot be used for the UL transmission. For example, for the group-based reporting, the UE needs to report multiple groups, and different DL RSs from different groups may be received simultaneously. However, the RSs or beams from different UL groups (e.g., with different UL panel IDs) cannot be transmitted simultaneously.

The following Table IV shows an example of joint group-based reporting with DL and UL beam information. In Table IV, for each of group, the UE further provides the UL group information indicating that whether the corresponding beam information can be used for UL transmissions or that whether UL beams with different UL group information can be transmitted simultaneously.

TABLE 4

Example for joint group-based reporting with DL and UL beam information

| Group information (e.g., 0, 1, . . .) | UL group information (e.g., NULL, 0, 1, . . .) | Beam ID | Beam quality (e.g. RSRP/SINR) |
|---|---|---|---|
| Group information-x | UL group information-x | RS ID-$x_1$ | Beam quality-$x_1$ |
|  |  | RS ID-$x_2$ | Beam quality-$x_2$ |
| Group information-y | UL group information-y | RS ID-$y_1$ | Beam quality-$y_1$ |
|  |  | RS ID-$y_2$ | Beam quality-$y_2$ |

In an embodiment, the Tx chains of the UE may switch from one UE panel to another one UE panel (e.g. UE antenna switching) and different beam(s) from different groups may be received simultaneously but cannot be transmitted simultaneously. In such condition, the following rules for the joint UL and DL group-based reporting may be considered.

In an embodiment, for the DL transmissions, different RSs from different groups can be received simultaneously, and/or different RSs from the same group cannot be received simultaneously.

In an embodiment, for the UL transmissions, at least one of the following candidate rules may be supported:

Rule-1: Tx beam(s) corresponding to up to X RSs from different groups can be transmitted simultaneously (X is a positive integer), and/or different Tx beam(s) corresponding to different RSs from the same group cannot be transmitted simultaneously. In an embodiment, only one Tx beam corresponding to one RS in the report instance can be transmitted at a given time instant.

Rule-2: Up to X RSs from different groups is associated for one or more UL transmissions, and/or different RSs from the same group cannot be associated with one or more UL transmissions. In an embodiment, the one or more UL transmissions occur at the same time instant.

Rule-3: the RSs from one or more groups to be reported can be transmitted or used for UL transmissions. In an embodiment, the one or more groups are the first/last N groups in a reporting instant, where N is a positive integer and/or indicated by a flag. As an alternative or in addition, only the DL RS from the first group can be used for the UL transmissions. In an embodiment, for one UL transmission, only one DL RS can be indicated as the spatial relation information.

Rule-4: Time-domain gap between two UL transmissions which are associated with separate DL RSs from different UL groups is required. Specifically, the UE Tx chain may switch among multiple UL groups (e.g., UE UL panels) and there is additional time gap requirement for the Tx chain being switched from one UL group to another UL group.

Rule-5: Tx beam(s) corresponding to up to X RS(s) from different N groups and Tx beam(s) corresponding to up to Y RS(s) from different M groups can be transmitted simultaneously, wherein X, Y, M, N are positive integers.

Rule-6: Up to X RS(s) from different N groups and up to Y RS(s) from different M groups be associated for one or more UL signals, wherein X, Y, M, N are positive integers. In an embodiment, the one or more UL signals are transmitted at a same time instant.

Figure 5:
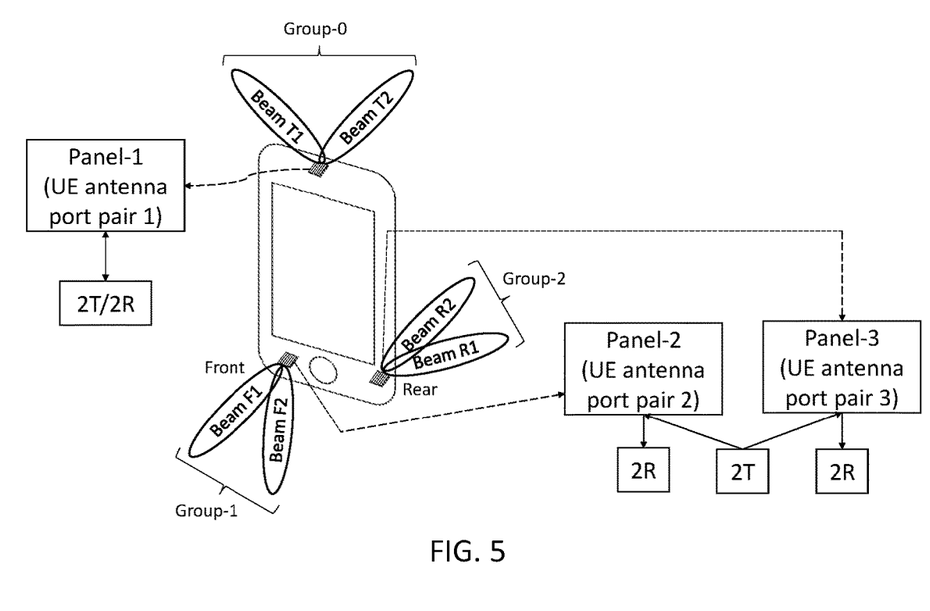
FIG. 5 shows a schematic diagram of a user equipment according to an embodiment of the present disclosure.

FIG. 5 shows a schematic diagram of the UE having 4 Tx chains, 6 Rx chains (4T6R) and three panels for the DL and UL transmissions, wherein a panel is configured at the top side of the UE (i.e. the panel-1), another panel is configured at the front side of the UE (i.e. the panel-2) and still another panel is configured at the rear side of the UE (i.e. the panel-3). As shown in FIG. 5, the panel-1 has its own Rx/Tx chain, and the panel-2 and the panel-3 share the Tx chains (i.e. the Tx chains are switched between the front panel and the rear panel). In an embodiment, the top side may have a very low probability for the UE blockage and the front and rear sides may have a high probability for the UE blockage. In such condition, there are three groups of beams to be reported in a reporting instance: {Beam T1, Beam T2} in a group-0 related to the top panel-1, {Beam F1, Beam F2} in a group-1 related to the front panel-2, and {Beam R1, Beam R2} in group-2 related to the rear panel-3.

In the embodiment shown in FIG. 5, for the DL transmissions, different beams from different groups may be received simultaneously and/or different beams from same groups cannot be received simultaneously. That is, one of the {Beam T1, Beam T2} and/or one of {Beam F1, Beam F2} and/or one of {Beam R1, Beam R2} may be simultaneously used for the DL transmissions. As an alternative or in addition, the beam T1 and beam T2 cannot be used simultaneously used for the DL transmissions. Similarly, the beam F1 and beam F2 cannot be used simultaneously used for the DL transmissions and the beam R1 and beam R2 also cannot be used simultaneously used for the DL transmissions.

In the embodiment shown in FIG. 5, for the UL transmissions, up to 1 Tx beam from the group-0 and up to 1 Tx beam from the group-1 and the group-2 can be transmitted simultaneously. In addition, there is a switching gap between the beam from the group-1 and the beam from the group-2.

Figure 6:
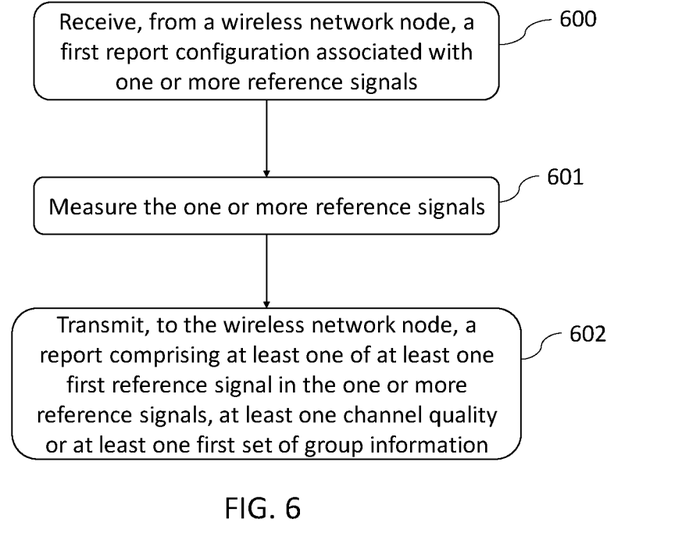
FIG. 6 shows a flowchart of a process according to an embodiment of the present disclosure.

FIG. 6 shows a flowchart of a process according to an embodiment of the present disclosure. The process shown in FIG. 6 may be used in a wireless terminal (e.g. UE) and comprises the following steps:

Step 600: Receive, from a wireless network node, a first report configuration associated with one or more reference signals.

Step 601: Measure the one or more reference signals.

Step 602: Transmit, to the wireless network node, a report comprising at least one of at least one first reference signal in the one or more reference signals, at least one channel quality or at least one first set of group information.

In the process shown in FIG. 6, the wireless terminal receives a first report configuration associated with one or more reference signals from a wireless network node (e.g. BS). In this embodiment, the wireless terminal measures the one or more reference signals and accordingly transmits a report to the wireless network node, e.g., based on measurement results. In an embodiment, the report comprises at least one of at least one first reference signal in the one or more reference signals, at least one channel quality or at least one first set of group information. Note that the at least one first set of group information may be selected from a plurality of sets of group information (e.g. a pool of group information).

In an embodiment, the wireless terminal may associate second set of group information with at least one of a triggering state, a measurement configuration, a measurement window, the first report configuration of the report or at least one second reference signal in the one or more reference signal. Note that the associations between the second set of group information and at least one of the triggering state, the measurement configuration, the measurement window, the first report configuration of the report or the at least one second reference signal in the one or more reference signal may be configured by the wireless network node. In an embodiment, the second set of group information may be selected from the plurality of sets of group information (e.g. the pool of group information).

In an embodiment, the at least one second reference signal is measured based on the second set of group information.

In an embodiment, the at least one second reference signal is not associated with at least one of a quasi-co-location assumption or a transmission configuration indicator state.

In an embodiment, the second set of group information are not used for measuring the one or more reference signal or are applied to other downlink transmissions or uplink transmissions.

In an embodiment, a mapping between the second set of group information and the at least one second reference signal is maintained in a measurement window.

In an embodiment, a single set of group information (e.g. the first set of group information or the second set of group information) comprises at least one of a reference signal resource set, a panel, a sub-array, an antenna group, an antenna port group, a beam, a beam group, a transmission unit or a reception unit. For example, a single set of group information may comprise at least one reference signal resource set, and/or at least one panel, and/or at least one sub-array, and/or at least one antenna group, and/or at least one antenna port group, and/or at least one beam, and/or at least one beam group, and/or at least one transmission unit and/or at least one reception unit.

In an embodiment, a mapping between the at least one first set of group information and the at least one first reference signal in a preceding group-based report is not maintained.

In an embodiment, a mapping between the at least one first set of group information and the at least one first reference signal in the report is maintained.

In an embodiment, the mapping is maintained X time units after transmitting the report or after receiving a confirmation message, where X is an integer.

In an embodiment, the wireless terminal measures the one or more reference signals by measuring at least one channel quality corresponding to the at least one first reference signal based on the at least one first set of group information.

In an embodiment, the report comprises a field indicating the first set of group information, wherein the field comprises a candidate value of "Null".

In an embodiment, the report comprises a field indicating at least one of a type of the report or the number of the at least one first set of group information, and wherein the type of the report comprises at least one of a group based type, a beam group based type, an antenna group based type, or a non-group based type.

In an embodiment, wherein at least one of the maximum number of the at least one first set of group information, a range of indexes corresponding to the at least one first set of group information, or a size of a field indicating the at least one first set of group information in the report is based on a capability signaling of the wireless terminal.

In an embodiment, the report further comprises a flag field indicating an availability of at least one of the at least one first reference signal or the at least one first set of group information for an uplink transmission.

In an embodiment, the first report configuration is associated with at least one of a second report configuration or a parameter of indicating the report for at least one of a downlink transmission, an uplink transmission or both a downlink and uplink transmission.

In an embodiment, at least one of the reference signal corresponding to the first or the last A first set of group information in the report, the first or the last B reference signals in the report, or the first or the last C reference signals in each first set of group information in the report is available for an uplink transmission, wherein A, B and C are positive integers.

In an embodiment, the report comprises at least one third set of group information, and wherein the reference signals corresponding to different third sets of group information are available for being simultaneously transmitted or for an uplink transmission.

In an embodiment, the report comprises at least one third set of group information, and wherein the reference signals corresponding to the same third set of group information or available for being simultaneously transmitted or for an uplink transmission.

In an embodiment, D reference signals out of the one or more reference signals are used for downlink transmissions or uplink transmissions performed at the same time, wherein D is a positive integer.

In an embodiment, the D reference signals correspond to different first sets of group information.

In an embodiment, the D reference signals correspond to the same first set of group information.

In an embodiment, there is a time gap between two uplink transmissions corresponding to different sets of group information or different reference signals.

In an embodiment, at most X reference signals of Y sets of group information and at most M reference signals of N sets of group information are transmitted simultaneously or are used for uplink transmissions performed at the same time, wherein X, Y, M and N are positive integers.

In an embodiment, the Y sets of group information are associated with at least one panel shared by a plurality of transmission chains and the N sets of group information are associated with at least one another panel shared by another plurality of transmission chains.

In an embodiment, an association (e.g. any association) between a single set of group information and one of the one or more reference signals is not applied in a measurement window.

In an embodiment, the one or more reference signals are confined within the measurement window.

In an embodiment, the wireless terminal receives only the one or more reference signals in the measurement window.

In an embodiment, the wireless terminal does not perform transmissions other than receiving the one or more reference signals in the measurement window.

In an embodiment, at least one of a measurement gap corresponding to the one or more reference signals, or a time gap between a channel of triggering the one or more reference signals and the first transmission of the one or more reference signals is greater than or equal to a threshold.

Figure 7:
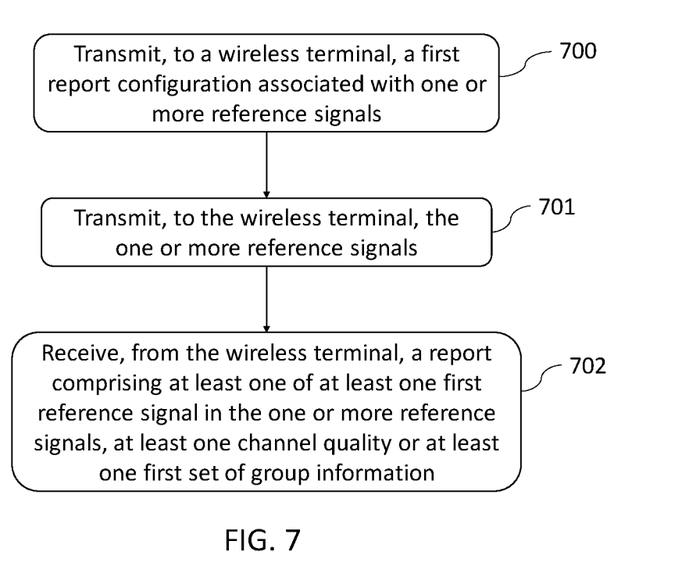
FIG. 7 shows a flowchart of a process according to an embodiment of the present disclosure.

FIG. 7 shows a flowchart of a process according to an embodiment of the present disclosure. The process shown in FIG. 7 may be used in a wireless network node (e.g. BS) and comprises the following steps:

Step 700: Transmit, to a wireless terminal, a first report configuration associated with one or more reference signals Step 701: Transmit, to the wireless terminal, the one or more reference signals Step 702: Receive, from the wireless terminal, a report comprising at least one of at least one first reference signal in the one or more reference signals, at least one channel quality or at least one first set of group information.

In the process shown in FIG. 7, the wireless network node transmits a first report configuration associated with one or more reference signals to a wireless terminal (e.g. UE). After transmitting the one or more reference signals to the wireless terminal, the wireless network node receives a report, e.g., comprising certain measurement results associated with the one or more reference signals. In this embodiment, the report comprises at least one of at least one first reference signal in the one or more reference signals, at least one channel quality or at least one first set of group information.

In an embodiment, second set of group information is associated with at least one of a triggering state, a measurement configuration, a measurement window, the first report configuration of the report or at least one second reference signal in the one or more reference signal.

In an embodiment, the at least one second reference signal is measured based on the second set of group information.

In an embodiment, the at least one second reference signal is not associated with at least one of a quasi-co-location assumption or a transmission configuration indicator state.

In an embodiment, the second set of group information are not used for measuring the one or more reference signal or are applied to other downlink transmissions or uplink transmissions.

In an embodiment, a mapping between the second set of group information and the at least one second reference signal is maintained in a measurement window.

In an embodiment, a single set of group information comprises at least one of information grouping one or more reference signals, a reference signal resource set, a panel, a sub-array, an antenna group, an antenna port group, a beam, a beam group, a transmission unit or a reception unit.

In an embodiment, a mapping between the at least one first set of group information and the at least one first reference signal in a preceding group-based report is not maintained.

In an embodiment, a mapping between the at least one first set of group information and the at least one first reference signal in the report is maintained.

In an embodiment, the mapping is maintained X time units after transmitting the report or after receiving a confirmation message, where X is an integer.

In an embodiment, at least one channel quality corresponding to the at least one first reference signal is measured based on the at least one first set of group information.

In an embodiment, the report comprises a field indicating the first set of group information, wherein the field comprises a candidate value of Null.

In an embodiment, the report comprises a field indicating at least one of a type of the report or the number of the at least one first set of group information, and wherein the type of the report comprises at least one of a group based type, a beam group based type, an antenna group based type, or a non-group based type.

In an embodiment, at least one of the maximum number of the at least one first set of group information, a range of indexes corresponding to the at least one first set of group information, or a size of a field indicating the at least one first set of group information in the report is based on a capability signaling of the wireless terminal.

In an embodiment, the report further comprises a flag field indicating an availability of at least one of the at least one first reference signal or the at least one first set of group information for an uplink transmission.

In an embodiment, the first report configuration is associated with at least one of a second report configuration or a parameter of indicating the report for at least one of a downlink transmission, an uplink transmission or both a downlink transmission and an uplink transmission.

In an embodiment, at least one of the reference signal corresponding to the first or the last A first sets of group information in the report, the first or the last B reference signals in the report, or the first or the last C reference signals in each first set of group information in the report is available for an uplink transmission, wherein A, B and C are positive integers.

In an embodiment, the report comprises at least one third set of group information, and wherein the reference signals corresponding to different third sets of group information are available for being simultaneously transmitted or for an uplink transmission.

In an embodiment, the report comprises at least one third set of group information, and wherein the reference signals corresponding to the same third set of group information or available for being simultaneously transmitted or for an uplink transmission.

In an embodiment, D reference signals out of the one or more reference signals are used for downlink transmissions or uplink transmissions performed at the same time, wherein D is a positive integer.

In an embodiment, the D reference signals correspond to different first sets of group information.

In an embodiment, the D reference signals correspond to the same first set of group information.

In an embodiment, there is a time gap between two uplink transmissions corresponding to different sets of group information or different reference signals.

In an embodiment, at most X reference signal of Y sets of group information and at most M reference signals of N sets of group information are transmitted simultaneously or are used for uplink transmissions performed at the same time, wherein X, Y, M and N are positive integers.

In an embodiment, the Y sets of group information are associated with at least one panel shared by a plurality of transmission chains and the N sets of group information are associated with at least one another panel shared by another plurality of transmission chains.

In an embodiment, an association between a single set of group information and one of the one or more reference signals is not applied in a measurement window.

In an embodiment, the one or more reference signals are confined within the measurement window.

In an embodiment, the wireless network node transmits only the one or more reference signals in the measurement window to the wireless terminal.

In an embodiment, the wireless network node does not perform transmissions with the wireless terminal other than transmitting the one or more reference signals in the measurement window.

In an embodiment, at least one of a measurement gap corresponding to the one or more reference signals, or a time gap between a channel of triggering the one or more reference signals and the first transmission of the one or more reference signals is greater than or equal to a threshold.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A skilled person would further appreciate that any of the various illustrative logical blocks, units, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software unit"), or any combination of these techniques.

To clearly illustrate this interchangeability of hardware, firmware and software, various illustrative components, blocks, units, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, unit, etc. can be configured to perform one or more of the functions described herein. The term "configured to" or "configured for" as used herein with respect to a specified operation or function refers to a processor, device, component, circuit, structure, machine, unit, etc. that is physically constructed, programmed and/or arranged to perform the specified operation or function.

Furthermore, a skilled person would understand that various illustrative logical blocks, units, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, units, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein. If implemented in software, the functions can be stored as one or more instructions or code on a computer-readable medium. Thus, the steps of a method or algorithm disclosed herein can be implemented as software stored on a computer-readable medium.

Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "unit" as used herein, refers to software, firmware, hardware, and any combination of these elements for performing the associated functions described herein. Additionally, for purpose of discussion, the various units are described as discrete units; however, as would be apparent to one of ordinary skill in the art, two or more units may be combined to form a single unit that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A wireless communication method for use in a wireless terminal, the wireless communication method comprising:
receiving, from a wireless network node, a first report configuration associated with one or more reference signals,
measuring the one or more reference signals, and
transmitting, to the wireless network node, a report comprising at least one first set of group information,
wherein a maximum number of the at least one first set of group information is based on a capability signaling of the wireless terminal,
wherein the first report configuration is associated with a parameter of indicating the report for at least one of a downlink transmission, an uplink transmission or both a downlink and an uplink transmission, and
wherein the report comprises at least one third set of group information, and wherein the reference signals corresponding to the at least one third set of group information are available for being simultaneously transmitted.

2. The wireless communication method of claim 1, wherein a single set of group information comprises information grouping one or more reference signals.

3. A wireless communication method for use in a wireless network node, the wireless communication method comprising:
transmitting, to a wireless terminal, a first report configuration associated with one or more reference signals,
transmitting, to the wireless terminal, the one or more reference signals, and
receiving, from the wireless terminal, a report comprising at least one first set of group information,
wherein a maximum number of the at least one first set of group information is based on a capability signaling of the wireless terminal,
wherein the first report configuration is associated with a parameter of indicating the report for at least one of a downlink transmission, an uplink transmission or both a downlink and an uplink transmission, and
wherein the report comprises at least one third set of group information, and wherein the reference signals corresponding to the at least one third set of group information are available for being simultaneously transmitted.

4. The wireless communication method of claim 3, wherein a single set of group information comprises information grouping one or more reference signals.

5. A wireless terminal, comprising:
a communication unit, configured to receive, from a wireless network node, a first report configuration associated with one or more reference signals, and
a processor configured to measure the one or more reference signals,
wherein the communication unit is further configured to transmit, to the wireless network node, a report comprising at least one first set of group information,
wherein a maximum number of the at least one first set of group information is based on a capability signaling of the wireless terminal,
wherein the first report configuration is associated with a parameter of indicating the report for at least one of a downlink transmission, an uplink transmission or both a downlink and an uplink transmission, and
wherein the report comprises at least one third set of group information, and wherein the reference signals corresponding to the at least one third set of group information are available for being simultaneously transmitted.

6. A wireless network node, comprising a communication unit, configured to:
transmit, to a wireless terminal, a first report configuration associated with one or more reference signals, and
transmit, to the wireless terminal, the one or more reference signals, and
receive, from the wireless terminal, a report comprising at least one of at least one first set of group information,
wherein a maximum number of the at least one first set of group information is based on a capability signaling of the wireless terminal, wherein the first report configuration is associated with a parameter of indicating the report for at least one of a downlink transmission, an uplink transmission or both a downlink and an uplink transmission, and wherein the report comprises at least one third set of group information, and wherein the reference signals corresponding to the at least one third set of group information are available for being simultaneously transmitted.

7. The wireless communication method of claim 1, wherein D reference signals out of the one or more reference signals are used for downlink transmissions or uplink transmissions performed at a same time, and wherein D is a positive integer.

8. The wireless communication method of claim 3, wherein D reference signals out of the one or more reference signals are used for downlink transmissions or uplink transmissions performed at a same time, and wherein D is a positive integer.

\* \* \* \* \*